United States Patent [19]

Hitchcock

[11] Patent Number: 4,472,162

[45] Date of Patent: Sep. 18, 1984

[54] BELT TENSIONER

[75] Inventor: Gary L. Hitchcock, Massillon, Ohio

[73] Assignee: Dyneer Corporation, Canton, Ohio

[21] Appl. No.: 369,217

[22] Filed: Apr. 16, 1982

[51] Int. Cl.³ .............................................. F16H 7/12
[52] U.S. Cl. ..................................... 474/135; 474/133; 474/117
[58] Field of Search ............... 474/115, 117, 133, 134, 474/135

[56] References Cited

U.S. PATENT DOCUMENTS

| | | | |
|---|---|---|---|
| 660,570 | 10/1900 | Green | 474/135 |
| 1,188,316 | 6/1916 | Pierce | 474/135 X |
| 2,739,778 | 3/1956 | Krone et al. | 403/111 |
| 3,136,170 | 6/1964 | Murray | 474/135 |
| 3,483,763 | 12/1969 | Enters | 474/88 X |
| 3,834,246 | 9/1974 | McGilp | 474/135 |
| 3,924,483 | 12/1975 | Walker et al. | 474/117 X |
| 4,285,676 | 8/1981 | Kraft | 474/135 |
| 4,351,636 | 9/1982 | Hager | 474/135 |
| 4,392,840 | 7/1983 | Radocaj | 474/117 |

FOREIGN PATENT DOCUMENTS

| | | | |
|---|---|---|---|
| 279415 | 11/1951 | Sweden | 474/135 |
| 585102 | 2/1947 | United Kingdom | 474/135 |

Primary Examiner—Lawrence J. Staab
Assistant Examiner—Dwight G. Diehl
Attorney, Agent, or Firm—Frease & Bishop

[57] ABSTRACT

A tensioning device for maintaining a predetermined amount of tensioning force on an endless drive belt for a vehicle accessories drive system. A shaft is mounted in a fixed position on the vehicle engine adjacent the drive belt. A housing is pivotally mounted on the shaft and is biased by a torsional coil spring in a belt tensioning direction. The spring is located within an annular space formed by spaced inner and outer housing walls and is telescopically mounted with respect to the shaft. A lever extends generally radially outwardly from the housing and an idler pulley is mounted on an end of the lever and is moved into tensioning engagement with the drive belt by the torsion spring. One end of the spring is attached to the housing and the other end is adapted to be fixed with respect to the shaft. The spring is placed in torsion and biases the lever and housing in the belt tensioning direction. An annular-shaped elastomer member is telescopically mounted on the shaft within a central housing bore and is compressed by an end plate against the shaft and housing to provide a shock-absorbing damping effect on the housing and belt-engaging pulley.

7 Claims, 9 Drawing Figures

BELT TENSIONER

BACKGROUND OF THE INVENTION

1. Field of the Invention

The invention relates to belt tensioning devices, and in particular to mechanical spring-actuated belt tensioning devices for use with the endless drive belts of the drive systems for vehicle accessories. More particularly, the invention relates to a relatively simple and compact belt tensioner operated by a torsional spring which maintains a predetermined tensioning force on the endless drive belt and which has improved shock-absorbing damping characteristics.

2. Description of the Prior Art

There is the trend today in the automobile industry to operate the various vehicle accessories, such as the power steering pump, water and air pumps, air conditioning and alternator, by a single endless belt driven by a pulley connected to the engine crankshaft. This system is referred to as a "serpentine" drive belt system. To ensure optimum operating efficiency for these various accessories, it is necessary that the drive belt be maintained at a predetermined tension to assure efficient performance of the accessories as well as satisfactory service life for the belt. Due to the relatively greater length of the single drive belt which replaces the heretofore plurality of smaller belts, there is a greater tendency for the belt to stretch which will affect the operating characteristics of the driven accessories. Therefore, it is desirable that a belt tensioning device be used for these endless belts to provide reliable service over an extended period of time and to maintain a constant amount of tension thereon regardless of the amount of belt stretch.

Numerous devices have been proposed and used to accomplish this purpose. One type of tensioner uses a bushing formed of an elastomeric material which is placed in compression by some mechanical means for continuously exerting a tensioning force on the belt. Examples of these constructions are shown in U.S. Pat. Nos. 3,975,965 and 4,144,772. These tensioners which use an elastomeric material as the tensioning means have the disadvantages in that the high load rate which they exert on the belt results in the rapid loss of tensioning as the belt stretches, and this load rate limits the stroke of the belt-engaged idler pulley to a shorter distance than desired. Also, sudden acceleration and deceleration of the drive belt can cause a whipping action to occur which creates a time lag before full damping is achieved.

Numerous other types of belt tensioning devices use compression or tension springs for applying and maintaining the tensioning force on a belt-engaging idler pulley or chain-engaging sprocket. Some examples of these types of constructions are shown in U.S. Pat. Nos. 2,703,019, 2,893,255, 3,413,866, 3,483,763, 3,631,734, 3,768,324, 3,812,733 and 3,965,768. Other various spring-actuated devices use the biasing force of a tension or compression spring in combination with hydraulic-actuated members for regulating the amount of tensioning force applied to the belt, depending on whether the engine is running or shut off. Examples of these combination hydraulic and spring-actuated tensioning devices are shown in U.S. Pat. Nos. 2,051,488, 3,142,193, and 4,077,272.

Due to the relatively large number of different vehicles and the different drive belt and accessory arrangements therefor, it is difficult to provide a tensioner construction which can be adapted for use in nearly all of these various installations. Also, it is desirable that such a belt tensioner can exert the necessary tensioning force and have a compact, rugged and inexpensive construction to minimize both original equipment cost and installation cost, and which reduces or eliminates maintenance.

The above-listed examples of spring-actuated belt tensioners use a coil spring which is placed in compression or tension for applying the belt tensioning force. It is difficult to achieve high tensioning forces with springs which are placed in tension or compression in a relatively small compact unit due to the size of the springs required to develop relatively large tensioning forces.

Other known tensioner constructions, such as shown in U.S. Pat. Nos. 3,136,170, 3,483,763, 3,834,246, 3,924,483 and 4,285,676, use torsional springs for pivotally moving an idler pulley or sprocket into tensioning engagement with a belt or chain, or for pivotally moving one of the vehicle accessories to achieve a desired tensioning force.

When a spring is used to apply the tensioning force, it is desirable that the belt tensioner be provided with some type of damping means to prevent excessive oscillation from occurring in the spring tensioning member. The damping means also will absorb sudden shocks to prevent a whipping action from occurring in the tensioner and drive belt, such as upon sudden acceleration and deceleration of the vehicle. This damping action is especially critical when a coil spring is used for applying the belt tensioning force since coil springs are highly susceptible to develop natural oscillating frequencies when the counter force which is exerted thereon by the belt fluctuates during acceleration and deceleration of the vehicle. However, such oscillating action also affects the efficiency of the tensioning force when applied to the belt by a torsional coil spring and will reduce belt life. These oscillating forces are even more pronounced in diesel engine-driven vehicles which are becoming more popular for the mass-produced passenger vehicle market.

Various damping devices have been used with belt tensioners to eliminate or reduce this problem of coil spring oscillation. One type of construction uses a hydraulic fluid as the damping means, such as shown in U.S. Pat. Nos. 2,893,255, 3,964,311, and 3,986,407. U.S. Pat. No. 3,710,634 shows a belt tensioner which uses an eccentrically mounted mechanical pinion and rack arrangement which is spring biased by a leaf spring for absorbing an excessive amount of shock as opposed to providing a damping action for a spring-biased belt tensioning plunger.

Therefore, the need has existed for a belt tensioner construction which is of a simple, rugged and compact design, which uses a coil torsional spring to achieve the belt tensioning force by directly engaging the belt with an idler pulley which is biased into belt tensioning engagement by the force of the torsional spring, and which is provided with damping means to reduce the natural oscillating frequencies that occur in coil springs.

There is no known belt tensioning construction of which I am aware which imparts a generally constant predetermined tensioning force on an endless drive belt by moving an idler pulley into tensioning engagement with the belt by the use of a coil torsional spring which is mounted in a telescopic relationship within a compact, rugged housing, and which has inexpensive damping means to reduce harmful oscillations and provide a shockabsorbing effect on the belt tensioner.

SUMMARY OF THE INVENTION

Objectives of the invention include providing a mechanical belt tensioner construction which is actuated by a coil spring placed in torsion and connected at one end to a housing which is pivotally mounted on a bracket located adjacent the drive belt, and which is fixedly connected at its other end with respect to the mounting bracket, and in which the coil spring is telescopically, concentrically mounted with respect to a shaft on which the housing is pivotally mounted. A further objective is to provide such a belt tensioner in which the housing is an integral, one-piece aluminum cast member having a pair of generally concentric cylindrical walls forming an annular space therebetween, and in which the torsional coil spring is located within this annular space. Another objective is to provide such a belt tensioner having a radially extending lever formed integrally with the housing on which an idler pulley is rotatably mounted for tensioning engagement with the endless belt, and in which a truncated, generally annular-shaped elastomer member is bonded in one end of the housing by an adhesive and is clamped into compression engagement with the shaft by an end plate to provide a damping action between the pivotally mounted housing and fixed shaft to reduce oscillations which occur naturally in coil springs due to sudden acceleration and deceleration of the vehicle and resulting belt whip.

Another objective is to provide such a belt tensioner in which the compression-producing end plate is provided with an arcuate cutout, in which a projection that is formed on the housing is located for engagement with the spaced ends of the arcuate cutout to provide stop points for the tensioner to prevent overstressing of the coil spring when installing the tensioner on a vehicle, and which prevents the pulley from pivoting beyond a predetermined amount should the belt break or become disengaged from the idler pulley. A still further objective is to provide such a tensioner in which the aluminum cast housing provides a lightweight rugged component which protects the torsional spring located within the housing from external abuse and from the harsh environment such as dust, dirt and the like, which it encounters, and which provides a safer device to the auto assemblers and mechanics who perform work on the vehicle engine and drive belts. Another objective is to provide such a belt tensioner which is of an extremely rugged and compact design and which is relatively inexpensive with respect to many known tensioning devices, which achieves the stated objectives in an effective and safe manner, and which solves problems and satisfies needs in the art.

These objectives and advantages are obtained by the improved belt tensioner construction for automatically tensioning an endless drive belt of the drive system for vehicle accessories, the general nature of which may be stated as including a shaft adapted to be mounted in a fixed position on a vehicle engine adjacent the drive belt; a housing pivotally mounted on the shaft; pulley means mounted on the housing and engageable with the drive belt for applying a tensioning force on said belt when the housing is pivoted in a belt tensioning direction; a torsional spring located within the housing and telescopically mounted with respect to the shaft and connected to the housing and adapted to be placed in torsion to bias the housing in the belt tensioning direction; and elastomer means operatively engageable with the shaft and housing for retarding oscillatory movement of the housing and pulley means.

BRIEF DESCRIPTION OF THE DRAWINGS

A preferred embodiment of the invention, illustrative of the best mode in which applicant has contemplated applying the principles, is set forth in the following description and shown in the accompanying drawings, and is particularly and distinctly pointed out and set forth in the appended claims.

Similar numerals refer to similar parts throughout the drawings.

DESCRIPTION OF THE PREFERRED EMBODIMENT

Figure 1:
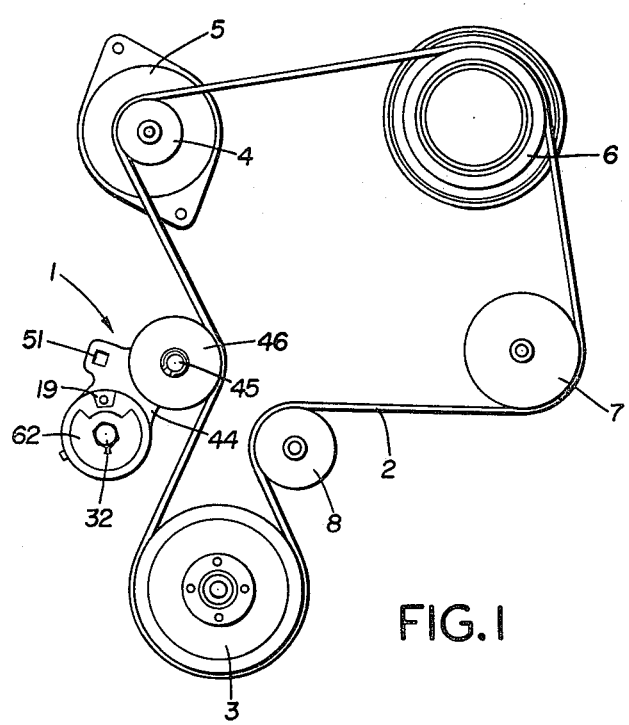
FIG. 1 is a diagrammatic view illustrating an endless drive belt operatively connected to and driving the vehicle engine accessories with the improved belt tensioner in tensioning engagement with the drive belt.

Referring to FIG. 1 of the drawings, the improved belt tensioner construction is indicated generally at 1, and is shown in tensioning engagement with an endless drive belt 2 of a belt drive system for the vehicle accessories. The drive system consists of a plurality of belt pulleys or sheaves having configurations and diameters determined by their associated engine accessory components and locations relative to each other. The various pulleys are supported on their respective engine components, which in turn are mounted on an engine in a usual manner known in the art. Preferably, belt 2 operates in a single vertical plane to eliminate binding and skewing of the belt.

The engine accessories drive system, as shown in FIG. 1, consists of a main driving pulley 3 which is operatively connected to the main drive shaft of the engine, a pulley 4 which is operatively connected to an alternator 5 which provides the electrical power for the engine, a pulley 16 which is operatively connected to the air conditioner compressor, a pulley 7 which is operatively connected to the engine power steering pump, and a pulley 8 which is operatively connected to the engine water pump. This engine accessory configuration is by way of example only and may vary depending upon the particular vehicle engine and manufacturer thereof.

Figure 2:
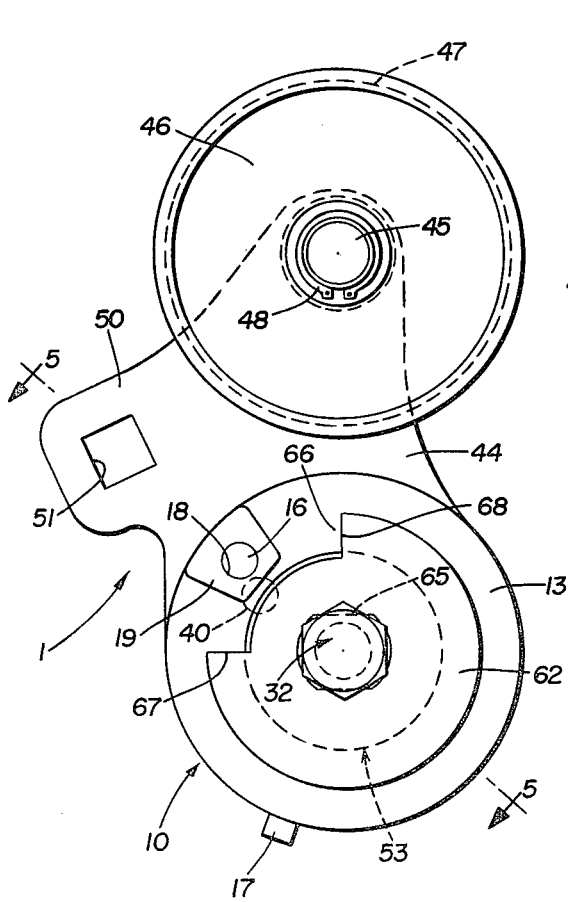
FIG. 2 is an enlarged plan view of the improved belt tensioner shown in FIG. 1.
Figure 3:
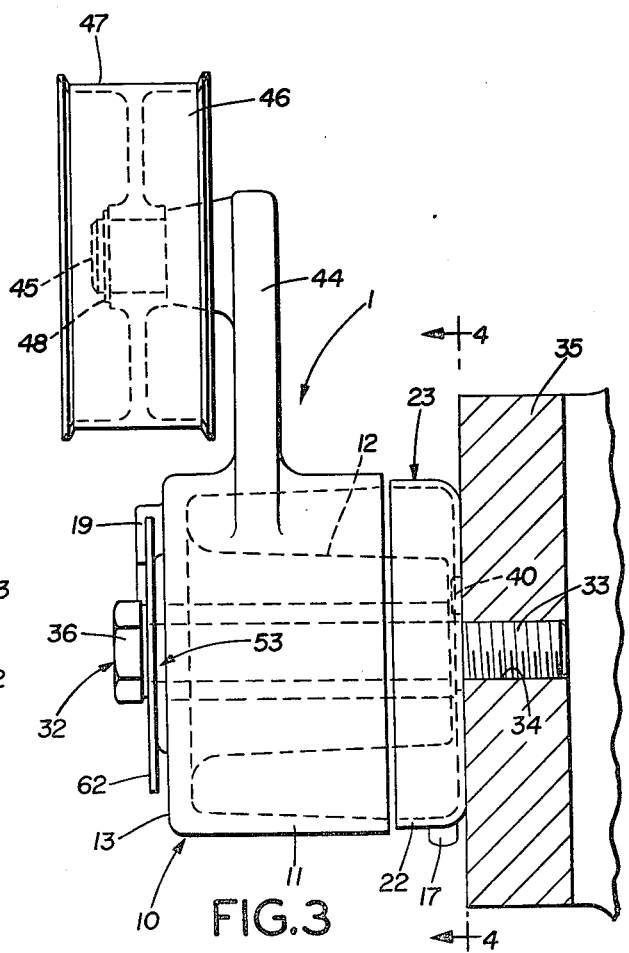
FIG. 3 is a right-hand side view of the improved belt tensioner construction shown in FIG. 2, shown mounted on an engine mounting bracket.
Figure 5:
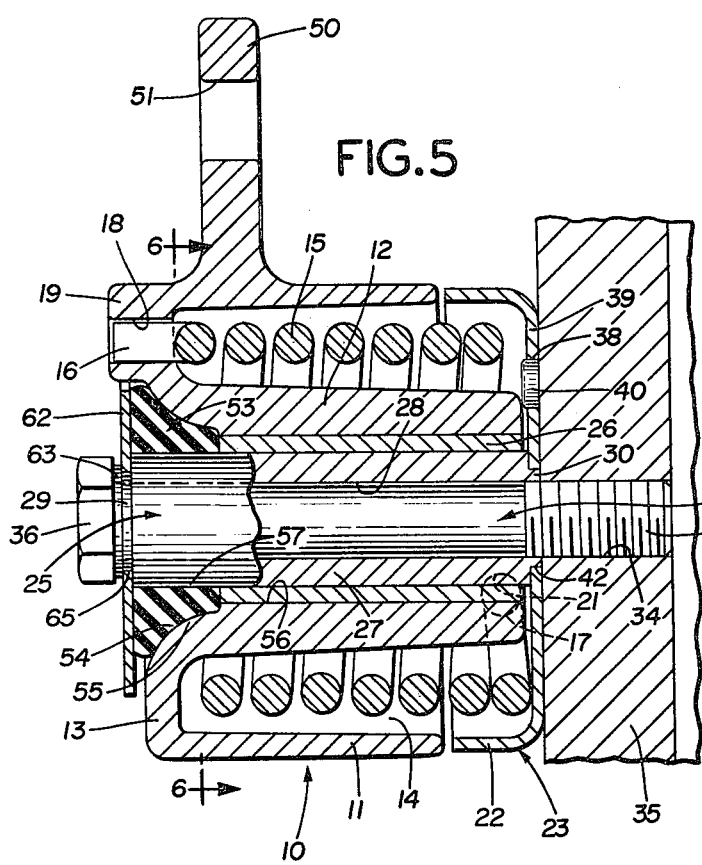
FIG. 5 is an enlarged sectional view taken on line 5—5, FIG. 2.
Figure 9:
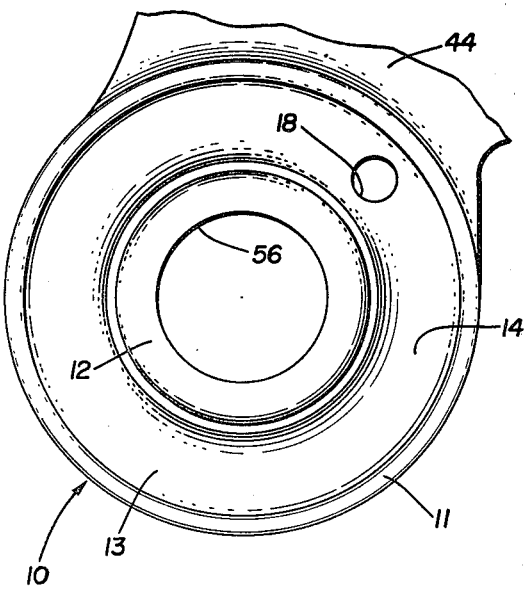
FIG. 9 is a fragmentary end view of the belt tensioner housing component of the improved belt tensioner.

Tensioner 1, shown particularly in FIGS. 2, 3 and 5, includes a one-piece, preferably cast aluminum housing, indicated generally at 10, formed by an outer generally cylindrical wall 11 and an inner generally cylindrical wall 12 integrally connected by an annular end wall 13 (FIG. 9). Housing walls 11 and 12 form an annular space or channel 14 therebetween in which a belt tensioning torsional spring 15 is mounted. Spring 15 is of a usual construction having a helical configuration, the coils of which are circular in cross section and which terminate in bent ends 16 and 17. End 16 extends through a complementary-shaped hole 18 which is formed in a boss 19 that is formed integrally with and projects axially outwardly from housing end wall 13. Bent spring end 17 extends radially outwardly through a hole 21 formed in a cylindrical side wall 22 of a housing end cap which is indicated generally at 23. Torsional spring 15 is telescopically mounted about inner cylindrical wall 12, as shown particularly in FIG. 5.

Figure 8:
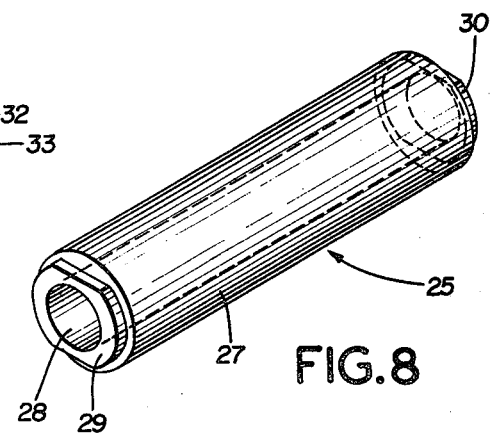
FIG. 8 is a perspective view of the shaft removed from the belt tensioner, as shown in FIG. 5.
Figure 6:
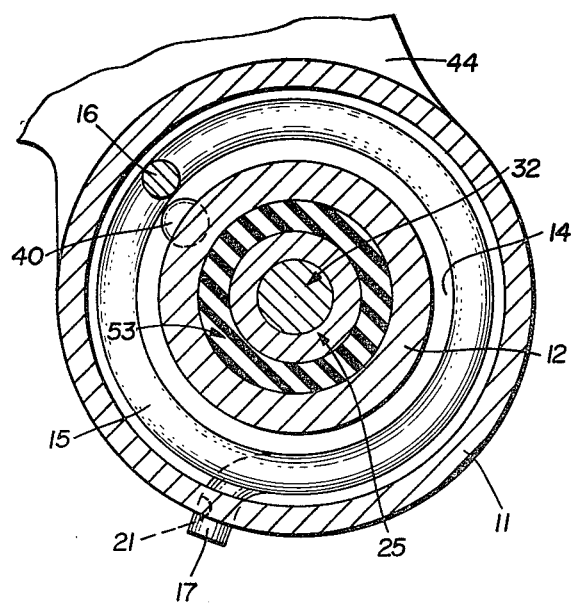
FIG. 6 is a fragmentary sectional view taken on line 6—6, FIG. 5.

Housing 10 is pivotally mounted on a shaft, indicated generally at 25 (FIG. 8), by a cylindrical bushing 26 which is telescopically mounted on the outer surface of shaft 25. The outer surface of bushing 26 is complementary to the interior cylindrical surface of inner housing wall 12. Shaft 25 includes a main cylindrical tubular body 27 having a smooth cylindrical interior bore 28. Body 27 terminates in a pair of flat-sided ends 29 and 30.

Figure 4:
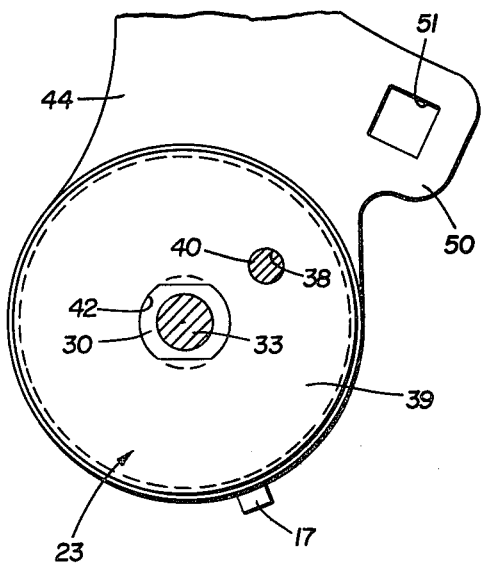
FIG. 4 is a fragmentary sectional view taken on line 4—4, FIG. 3.

Housing 10, bushing 26 and shaft 25 are telescopically mounted on an engine mounting bolt 32 which has a threaded end 33 that is engaged within a threaded hole 34 of an engine mounting bracket 35. The outer extended end of bolt 32 has a bolt head 36. Housing end cap 23 (FIG. 4) includes a circular end wall 39 formed with a hole 38 through which an alignment pin 40 extends to prevent end cap 23 from rotating with respect to mounting bracket 35. Alignment pin 40 projects outwardly from mounting bracket 35 a distance generally equal to the thickness of end wall 39 of end cap 23. A flat-sided, generally oval-shaped opening 42 is formed in the center of end wall 39 of housing cap 23 complementary to flat-sided end 30 of shaft 25 which is seated therein. The engagement of shaft end 30 with opening 42 together with alignment pin 40 prevents rotation of end cap 23 with respect to engine mounting bracket 35.

A radially outwardly extending lever 44 (FIG. 3) is formed integrally with outer housing wall 11 and terminates in a perpendicularly forwardly extending stub shaft 45. A usual idler pulley 46 having an outer peripheral belt-receiving groove 47 is rotatably mounted on stub shaft 45 and retained thereon by a retainer ring 48 (FIG. 2). Lever 44 is formed with an outwardly projecting portion 50 formed with a squared hole 51 for receiving an installation tool when installing tensioner 1 in belt tensioning engagement with belt 2.

Figure 7:
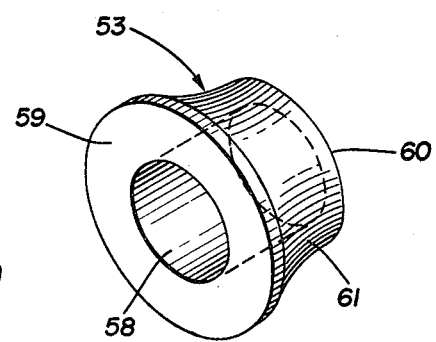
FIG. 7 is a perspective view of the elastomer damping member removed from the belt tensioner, as shown in FIG. 5.

In accordance with one of the main features of the invention, a hollow, generally truncated-shaped elastomer member, indicated generally at 53, is mounted in an outer conical housing end portion 54 (FIGS. 5 and 7). Conical portion 54 is formed by an annular curved wall portion 55 which connects housing end wall 13 with inner cylindrical surface 56 of housing inner wall 12. Elastomer member 53 includes a hollow cylindrical bore 58, an annular flat outer end surface 59 and a smaller flat inner end surface 60 connected by a conical side wall 61.

Elastomer member 53 is telescopically mounted on the outer end portion of cylindrical body 27 of shaft 25 and is placed in a compressed state by a clamping pressure exerted thereon by an end retainer plate 62 and washer 63. Retainer plate 62 is placed in clamping abutting engagement with outer annular surface 59 of elastomer member 53 with inner annular surface 60 being in abutment with the outer edge of bushing 26 (FIG. 5). Conical side wall 61 of elastomer member 53 is bonded by an adhesive or other means to annular conical surface 55 of housing 10 which assists elastomer member 53 in providing the desired damping action between movably mounted housing 10 and between fixed shaft 25 and retaining plate 62. End retaining plate 62 is formed with a flat-sided oval-shaped opening 65 complementary to the shape of flat-sided end 29 of shaft 25 which extends through opening 65 mounting retainer plate 62 thereon in a nonrotatable condition (FIG. 2). Plate 62 is swaged on end 29 of shaft 25 after placing elastomer member 53 in a compressed state. End cap 23 also is swaged on shaft end 30 to firmly mount cap 23 thereon.

End retainer plate 62 is formed with an arcuate cutout 66 in its outer periphery forming two radially extending edges 67 and 68 which form stops for the pivotal or journaled movement in either direction of housing 10 by their engagement with boss 19 of housing end wall 13.

The operation of improved belt tensioner 1 is easily understood from FIGS. 1, 2, 3 and 5. Tensioner 1 is mounted by mounting bracket 35 on a vehicle engine closely adjacent drive belt 2. After mounting of tensioner 1 on bracket 35, lever 44 is manually rotated in a counterclockwise direction with respect to FIG. 1 by insertion of a tool in squared opening 51. Since spring end 16 is fixed in housing 10 and spring end 17 is fixed in housing end cap 23, which in turn is fixedly mounted on bracket 35, this counterclockwise movement of lever 44 will pivot housing 10 and place spring 15 in greater torsion than the preloaded torsional force which is placed on spring 15 when it is installed in housing 10 and engaged with end plate 23. Stop edge 67 of end retaining plate cutout 66 will engage housing boss 19 (FIG. 2) to prevent a mechanic from applying an excessive tensioning force on spring 15 which could possibly damage the spring or other tensioner components.

Upon release of lever arm 44, spring 15 will bias the housing, lever and idler pulley in a clockwise position in attempting to return to its at-rest or preloaded state. This movement will move idler pulley 46 in a belt tensioning direction (clockwise, FIG. 1) and into belt tensioning engagement with belt 2 which is located within pulley groove 47 to apply a predetermined tensioning force on the belt.

Elastomer member 53 provides an effective damping effect by retarding movement of lever 44 and housing 10 in a nontensioning direction due to the frictional engagement between the interior cylindrical surface 57 of elastomer bore 58 with the outer surface of shaft body 27, together with the frictional engagement of flat outer annular end surface 59 with end retainer plate 62. These surfaces are not bonded together as are housing conical surface 55 and conical side wall 61 of elastomer member 53 but are in retarding engagement therewith due to the compression of elastomer member 53 by retainer plate 62. However, this sliding frictional engagement between elastomer member 53 and between shaft 25 and plate 62 does not impair the tensioning force applied to belt 2 due to the continuous and gradual movement of these members in the tensioning direction.

This continuous damping engagement between elastomer member 53 and between shaft 25 and retainer plate 62 prevents undesirable oscillating frequencies from occurring or developing in spring 15 due to the repeated engagement and disengagement of the air conditioner clutch and also due to the pulsating action of the air conditioner compressor when engaged. Also, these undesirable oscillations can occur in those belt tensioners using coil springs for applying the belt tensioning force due to the natural tendency of coil springs to develop oscillating frequencies. Furthermore, this damping prevents belt whip from occurring during sudden acceleration or deceleration of the vehicle engine.

Improved belt tensioner 1 has a number of advantages. The lightweight, cast aluminum housing provides a rugged enclosure for the torsional spring, reducing the possibility of damage to the spring, and eliminating exposure of the spring to much of the harsh environment which it encounters when mounted on the engine of a vehicle. The housing also protects a mechanic when installing a new belt or performing work on the engine.

One of the main advantages provided by tensioner 1 is the shock-absorbing damping effect, which reduces considerably if not completely, the undesirable oscillations from developing in the tensioner due to the use of a coil spring for applying the belt tension force, and which reduces the harmful effects of belt whip which occur during rapid acceleration and deceleration of the vehicle engine and the harmful oscillation produced by the air conditioner clutch and compressor. Also, various tensioning forces can be obtained by merely choosing a spring having various force characteristics and by determining the amount of pretensioning stress placed on the spring.

Stop edge 67 of retainer plate 62, in combination with housing boss 19, prevents an auto mechanic or installer from overstressing torsional spring 15 beyond its elastic limits, and stop edge 68 will prevent the tensioner and idler pulley from contacting other engine components upon breakage of a drive belt by limiting the movement of the housing and pulley in the tensioning direction by engagement of boss 19. Also, the improved tensioner has a minimum number of parts which reduces the possibility of breakage and maintenance. The damping effect provided by elastomer member 53 is extremely important when tensioner 1 is used on diesel-powered engines due to the increased oscillation which can be imparted to the drive belt.

The simplicity and compactness of the improved belt tensioner utilizing a torsion spring to maintain a predetermined belt tension when installed combined with its shock-absorbing and oscillation-damping characteristics are achieved by the removable installation of the tensioner on an engine bracket by telescoping a cylindrical tubular shaft over a bracket mounting post, by telescopically journaling on the shaft a housing having an annular channel shape in cross section with a channel therein defined by web and inner and outer channel leg walls, by telescopically enclosing the torsion spring in the housing channel, and by engaging the elastomer with the shaft body and portions of the housing web and inner end wall at the end of the shaft remote from the bracket.

I claim:

1. A belt tensioner construction for automatically tensioning an endless belt of a drive system for vehicle accessories of the type in which a shaft is mounted on a vehicle engine bracket adjacent the drive belt, in which a torsion spring telescopically surrounds the shaft, in which a housing encloses said spring and shaft, and in which said housing has a lever arm extending radially outwardly of the housing having a pulley journaled on its outer end adapted to be urged by said torsion spring to drive belt engaging tensioning position, wherein the improvement comprises:
   (a) a shaft having a cylindrical tubular body having removable fixed engagement with said bracket and being telescoped over a mounting post having removable threaded engagement with said bracket;
   (b) a housing journaled on said shaft having an annular body channel shaped in cross section, forming an annular channel defined by a channel web wall and inner and outer channel leg walls opening toward said bracket when said housing body is telescoped over and its inner channel leg wall journaled on said tubular shaft body;
   (c) a torsion spring located in said housing annular channel having one end connected to said housing body and the other end fixed with respect to said bracket, said spring being adapted to be placed in torsion to bias the housing body in belt tensioning direction; and
   (d) elastomer means engaged with said shaft body and adjacent portions of the channel web and inner leg walls of the housing channel body for retarding oscillatory movement of the housing and pulley.

2. The tensioner construction defined in claim 1 in which the elastomer means is an annular-shaped member of an elastomer material and is telescopically mounted on the end of the shaft remote from said bracket and is bonded to the adjacent portions of the channel web and inner leg walls of the housing to provide a damping effect between said housing and shaft to retard oscillatory movement therebetween.

3. The tensioner construction defined in claim 2 in which the elastomer member has a hollow, generally truncated shape and is bonded by an adhesive to the housing and is in compression against the shaft to provide a damping effect between the shaft and housing.

4. The tensioner construction defined in claim 3 in which an end plate is mounted on the shaft by said post and clamps the elastomer member into a compressed condition with the housing and shaft.

5. The tensioner construction defined in claim 4 in which the end plate is formed with a pair of spaced stops engageable with the housing to limit the journaled movement of the housing.

6. The tensioner construction defined in claim 5 in which the end plate is formed with an arcuate cutout; in which an outwardly extending boss is formed on the web wall of the housing and is located within the arcuate cutout of the end plate; and in which the housing boss engages portions of the end plate at the ends of the arcuate cutout to provide the stops.

7. The tensioner construction defined in claim 4 in which the outer surface of adjacent portions of the channel web and inner leg walls of the housing channel body is formed with a generally conically shaped portion; and in which the elastomer member extends into said conically shaped portion and is compressed by the end plate against said conically shaped portion.

* * * * *

UNITED STATES PATENT AND TRADEMARK OFFICE
CERTIFICATE OF CORRECTION

PATENT NO.   : 4,472,162

DATED        : September 18, 1984

INVENTOR(S)  : Gary L. Hitchcock

It is certified that error appears in the above-identified patent and that said Letters Patent is hereby corrected as shown below:

Col. 4, line 61, delete the letter "1" before the numeral "6";

Col. 7, after line 67, insert the last four paragraphs of Specification, as follows:

-Accordingly, the construction is simplified, provides an effective, safe, inexpensive, and efficient device which achieves all the enumerated objectives, provides for eliminating difficulties encountered with prior devices, and solves problems and obtains new results in the art.

-In the foregoing description, certain terms have been used for brevity, clearness and understanding; but no unnecessary limitations are to be implied therefrom beyond the requirements of the prior art, because such terms are used for descriptive purposes and are intended to be broadly construed.

-Moreover, the description and illustration of the invention is by way of example, and the scope of the invention is not limited to the exact details shown or described.

-Having now described the features, discoveries and principles of the invention, the manner in which the improved belt tensioner is constructed and used, the characteristics of the construction, and the advantageous, new and useful results obtained, the new and useful structures, devices, elements, arrangements, parts and combinations are set forth in the appended claims. - ;

UNITED STATES PATENT AND TRADEMARK OFFICE
CERTIFICATE OF CORRECTION

PATENT NO. : 4,472,162
DATED : September 18, 1984
INVENTOR(S) : Gary L. Hitchcock It is certified that error appears in the above-identified patent and that said Letters Patent is hereby corrected as shown below:

Claim 4, col. 8, line 47, insert - mounting - before "post".

Signed and Sealed this

Twelfth Day of March 1985

[SEAL]

Attest:

DONALD J. QUIGG

Attesting Officer     Acting Commissioner of Patents and Trademarks